May 22, 1928.  
G. C. EMERSON  
COTTON PLANTER  
Filed April 6, 1927
1,670,883
2 Sheets-Sheet 1
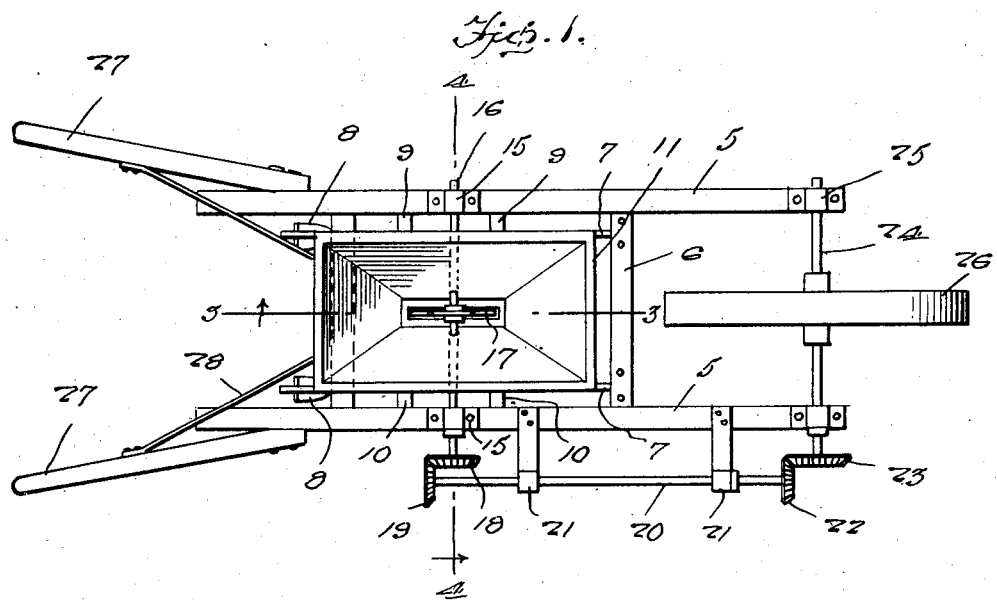
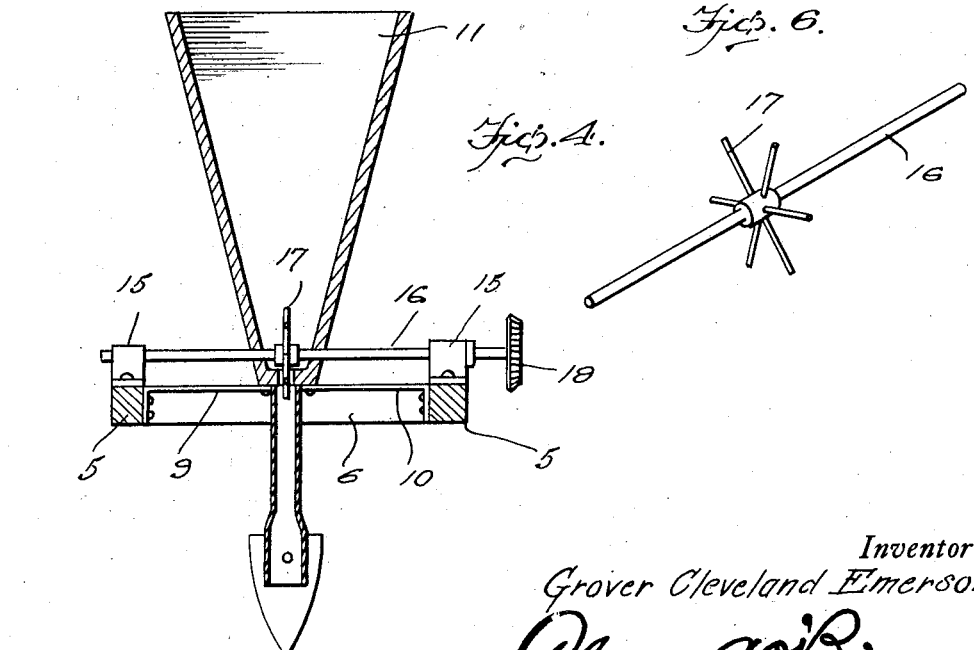
Inventor
Grover Cleveland Emerson
By Clarence A. O'Brien
Attorney May 22, 1928.

G. C. EMERSON

COTTON PLANTER

Filed April 6, 1927

Inventor
Grover Cleveland Emerson
By Clarence A O'Brien
Attorney

Patented May 22, 1928.

1,670,883

UNITED STATES PATENT OFFICE.

GROVER CLEVELAND EMERSON, OF OOLTEWAH, TENNESSEE.

COTTON PLANTER.

Application filed April 6, 1927. Serial No. 181,580.

This invention relates to new and useful improvements in cotton planters and has for its primary object to provide a manually propelled planting structure wherein the cotton seed will be properly delivered from the hopper during the movement of the machine over the ground.

An additional object of the invention resides in the provision of a planter that is of relatively simple construction, inexpensive of manufacture, and one that is well adapted for all the purposes for which it is intended.

With the foregoing and other objects which will become apparent as the nature of the invention is better understood, the same comprising the novel form, combination and arrangement of parts hereinafter more fully described, shown in the accompanying drawings, and claimed.

In the drawings wherein like numerals indicate like parts throughout the several views:

Figure 1 is a top plan view of a cotton planter constructed in accordance with the present invention.

Figure 4 is a detail transverse section taken substantially upon the line 4—4 of Figure 1 and looking forwardly in the direction of the arrow.

Figure 6 is a similar view of the seed distributor and its carrying shaft.

Figure 2:
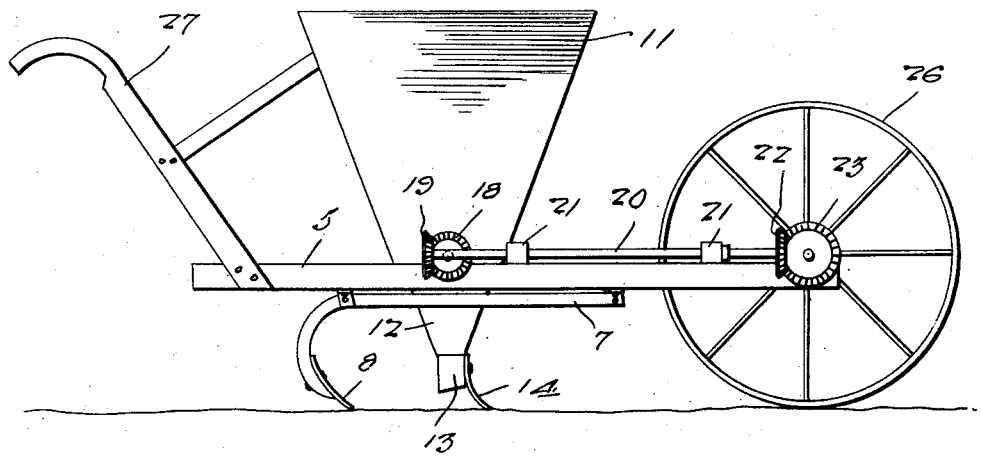
Figure 2 is a side elevation thereof.
Figure 3:
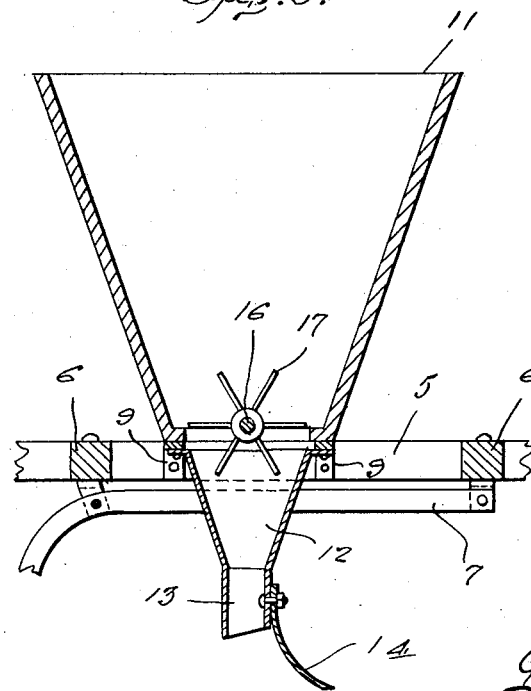
Figure 3 is an enlarged fragmentary section disclosing more clearly the seed discharging mechanism of the hopper.
Figure 5:
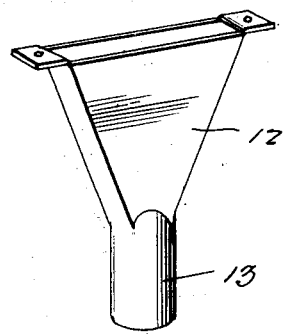
Figure 5 is a perspective of the seed discharge spout.

Now having particular reference to the drawings, my novel planter constitutes the provision of a pair of spaced parallel frame bars 5—5 interconnected by means of a pair of spaced transverse bars 6—6. Extending horizontally rearwardly beneath the parallel frame bars 5—5 adjacent the opposite ends thereof are cultivator beams 7—7 that are connected to the under sides of the cross bars 6—6, the rear ends of these beams being curved downwardly and having attached thereto cultivator points 8—8. Rigidly secured to the inner sides of the parallel frame bars 5—5 intermediate the transverse bars 6—6 are inwardly directed spaced strap irons 9—9 and 10—10 respectively that terminate at their inner ends in slight spaced relation as indicated in Figure 4. Supported upon the inner ends of these strap irons and suitably secured thereto is a vertically extending seed hopper 11 having inclined side walls as more clearly indicated in Figures 3 and 4. The bottom wall of this hopper 11 is open and anchored therebeneath to the strap irons 9—9 and 10—10 is a seed discharge spout 12, the upper end of which is also of inclined formation, while the lower end thereof terminates into a cylindrical end nozzle 13 upon the front side of which is a depending cultivator point 14.

Journaled within bearings 15—15 upon the top sides of the parallel frame bars 5—5 at opposite sides of the hopper 11 is a transverse shaft 16 that extends through registering openings in the side walls of the hopper 11. Keyed to this shaft 16 within the hopper 11 is an agitator 17 in the form of a spoked hub as more clearly indicated in Figure 6. One end of the shaft 16 is equipped with a bevel gear 18 that is in mesh with a bevel gear 19 upon the rear end of a longitudinally extending shaft 20 journaled within suitable strap bearings 21 projecting laterally from the adjacent frame bar 5. The forward end of this shaft is equipped with a similar bevel gear 22 that is in mesh with a slightly larger bevel gear 23 upon the adjacent end of a transverse shaft 24 journaled in bearings 25 upon the forward ends of the bars 5—5 and to which is keyed a supporting wheel 26 for the forward end of the planter frame.

Secured to the rear ends of the frame bars 5—5 are rearwardly inclined handles 27—27 that are braced to the hopper 11 by brace bars 28.

It will thus be seen that in the use of a planter of this character, the earth directly beneath the discharge spout of the hopper 11 will be furrowed for receiving the seed dropped from the hopper by reason of the rotation of the agitator 17 therein. The cultivator points 8—8 will turn the earth over into the furrow for completely covering the same.

It will be apparent to those skilled in the art that I have provided a highly novel, simple, and efficient form of cotton planter that is well adapted for all the purposes heretofore designated and even though I have herein shown and described a hopper as consisting of certain detailed structural elements it is nevertheless to be understood that some changes may be made therein without affecting the spirit and scope of the appended claim.

Having thus described the invention, what I claim as new and desire to secure by Letters Patent is:—

In a cotton planter of the class described, a frame including a pair of spaced side bars, interconnecting transverse bars at the opposite sides of the center of said side bars, transverse strap irons secured at their outer ends to the inner sides of the side bars between said transverse bars and terminating in spaced relation at the center of the frame, a seed hopper open at its lower end and supported vertically upon the inner opposed spaced ends of the strap iron, a seed discharge spout for disposition against the lower open end of the hopper, and laterally extending attaching ears formed on the upper end of the spout at the opposite sides thereof for attachment to the inner opposed ends of the strap irons.

In testimony whereof I affix my signature.

GROVER CLEVELAND EMERSON.